US012263128B2

(12) United States Patent
Schwardt et al.

(10) Patent No.: US 12,263,128 B2
(45) **Date of Patent: *Apr. 1, 2025**

(54) SYSTEMS AND METHODS FOR CONTROLLING MULTIPLE SURGICAL VARIABLES

(71) Applicant: NuVasive Specialized Orthopedics, Inc., San Diego, CA (US)

(72) Inventors: Jeffrey Schwardt, Palo Alto, CA (US); Michael Wentz, Zionsville, PA (US); Jorge Lopez Camacho, Oxnard, CA (US); Frank Phillips, Highland Park, IL (US); Dennis Crandall, Mesa, AZ (US); Alexander Vaccaro, Gladwyne, PA (US)

(73) Assignee: NuVasive Specialized Orthopedics, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/472,831

(22) Filed: Sep. 22, 2023

(65) Prior Publication Data

US 2024/0009053 A1 Jan. 11, 2024

Related U.S. Application Data

(63) Continuation of application No. 17/689,471, filed on Mar. 8, 2022, now Pat. No. 11,801,187, which is a (Continued)

(51) Int. Cl.

*A61G 13/00* (2006.01)
*A61G 13/04* (2006.01)

(Continued)

(52) U.S. Cl.

CPC .......... *A61G 13/0054* (2016.11); *A61G 13/04* (2013.01); *A61G 13/08* (2013.01);

(Continued)

(58) Field of Classification Search

CPC .... A61G 13/0054; A61G 13/08; A61G 13/04; A61G 13/12; A61G 15/02; A61H 1/0222;

(Continued)

(56) References Cited

U.S. PATENT DOCUMENTS

| | | | |
|---|---|---|---|
| 1,374,115 | A | 4/1921 | Roemer |
| 2,693,796 | A | 11/1954 | Warner |

(Continued)

FOREIGN PATENT DOCUMENTS

| | | |
|---|---|---|
| CN | 1697630 A | 11/2005 |
| CN | 101040807 A | 9/2007 |

(Continued)

OTHER PUBLICATIONS

Abe et al., "Experimental external fixation combined with percutaneous discectomy in the management of scoliosis.", Spine, 1999, pp. 646-653, 24, No. 7.

(Continued)

*Primary Examiner* — Justin C Mikowski
*Assistant Examiner* — Alison N Labarge

(57) ABSTRACT

A method for performing a surgical procedure includes: positioning a patient in a surgical patient interface device that includes: a base, a platform coupled to the base, and a first abutment and a second abutment each coupled to the platform; rotating the platform between a first position and a second position, where, in the first position, the platform extends in a substantially horizontal direction relative to the base, and the first and second abutments are separated by a first distance, and in the second position, the platform extends in a substantially vertical direction relative to the base; adjusting one or both of the first and second abutments relative to the platform such that, in the second position, the first and second abutments are separated by a second dis- (Continued)

tance different from the first distance; and accessing a target portion of skin of the patient for the surgical procedure.

20 Claims, 5 Drawing Sheets

Related U.S. Application Data continuation of application No. 16/058,750, filed on Aug. 8, 2018, now Pat. No. 11,278,462, which is a continuation of application No. PCT/US2017/017331, filed on Feb. 10, 2017.

(60) Provisional application No. 62/293,755, filed on Feb. 10, 2016.

(51) Int. Cl.
*A61G 13/08* (2006.01)
*A61G 13/12* (2006.01)
*A61G 15/02* (2006.01)
*A61H 1/02* (2006.01)

(52) U.S. Cl.
CPC ............. *A61G 13/12* (2013.01); *A61G 15/02* (2013.01); *A61H 1/0222* (2013.01); *A61H 1/0229* (2013.01); *A61H 1/0292* (2013.01); *A61H 2201/0192* (2013.01); *A61H 2201/1207* (2013.01); *A61H 2201/1604* (2013.01); *A61H 2201/1609* (2013.01); *A61H 2201/1623* (2013.01); *A61H 2201/1628* (2013.01); *A61H 2201/1635* (2013.01); *A61H 2201/164* (2013.01); *A61H 2201/1652* (2013.01); *A61H 2201/1671* (2013.01); *A61H 2203/0412* (2013.01); *A61H 2203/0487* (2013.01)

(58) Field of Classification Search
CPC ................ A61H 1/0292; A61H 1/0229; A61H 2201/1671; A61H 2201/164; A61H 2201/1623; A61H 2201/1609; A61H 2201/0192; A61H 2201/1628; A61H 2201/1604; A61H 2201/0487; A61H 2201/1652; A61H 2201/1635; A61H 2201/1207
See application file for complete search history.

(56) References Cited

U.S. PATENT DOCUMENTS 2,702,031 A 2/1955 Wenger
2,865,367 A 12/1958 Sorenson
2,950,715 A 8/1960 Brobeck
3,111,945 A 11/1963 Von Solbrig
3,293,667 A * 12/1966 Ohrberg ................ A61G 7/005 601/24
3,372,476 A 3/1968 Peiffer
3,377,576 A 4/1968 Langberg
3,512,901 A 5/1970 Law
3,597,781 A 8/1971 Eibes
3,655,968 A 4/1972 Moore et al.
3,900,025 A 8/1975 Barnes, Jr.
3,915,151 A 10/1975 Kraus
RE28,907 E 7/1976 Eibes et al.
3,976,060 A 8/1976 Hildebrandt et al.
4,010,758 A 3/1977 Rockland et al.
4,056,743 A 11/1977 Clifford et al.
4,068,821 A 1/1978 Morrison
4,078,559 A 3/1978 Nissinen
4,204,541 A 5/1980 Kapitanov
4,357,946 A 11/1982 Dutcher et al.
4,372,551 A 2/1983 Yurdin
4,386,603 A 6/1983 Mayfield
4,448,191 A 5/1984 Rodnyansky et al.
4,486,176 A 12/1984 Tardieu et al.
4,501,266 A 2/1985 McDaniel
4,522,501 A 6/1985 Shannon
4,537,520 A 8/1985 Ochiai et al.
4,550,279 A 10/1985 Klein
4,561,798 A 12/1985 Elcrin et al.
4,573,454 A 3/1986 Hoffman
4,592,355 A 6/1986 Antebi
4,595,007 A 6/1986 Mericle
4,642,257 A 2/1987 Chase
4,658,809 A 4/1987 Ulrich et al.
4,700,091 A 10/1987 Wuthrich
4,747,832 A 5/1988 Buffet
4,854,304 A 8/1989 Zielke
4,904,861 A 2/1990 Epstein et al.
4,931,055 A 6/1990 Bumpus et al.
4,940,467 A 7/1990 Tronzo
4,957,495 A 9/1990 Kluger
4,973,331 A 11/1990 Pursley et al.
5,010,879 A 4/1991 Moriya et al.
5,030,235 A 7/1991 Campbell, Jr.
5,041,112 A 8/1991 Mingozzi et al.
5,064,004 A 11/1991 Lundell
5,074,882 A 12/1991 Grammont et al.
5,092,889 A 3/1992 Campbell, Jr.
5,133,716 A 7/1992 Plaza
5,142,407 A 8/1992 Varaprasad et al.
5,156,605 A 10/1992 Pursley et al.
5,263,955 A 11/1993 Baumgart et al.
5,290,289 A 3/1994 Sanders et al.
5,306,275 A 4/1994 Bryan
5,330,503 A 7/1994 Yoon
5,334,202 A 8/1994 Carter
5,336,223 A 8/1994 Rogers
5,356,411 A 10/1994 Spievack
5,356,424 A 10/1994 Buzerak et al.
5,364,396 A 11/1994 Robinson et al.
5,403,322 A 4/1995 Herzenberg et al.
5,429,638 A 7/1995 Muschler et al.
5,437,266 A 8/1995 McPherson et al.
5,466,261 A 11/1995 Richelsoph
5,468,030 A 11/1995 Walling
5,480,437 A 1/1996 Draenert
5,509,888 A 4/1996 Miller
5,516,335 A 5/1996 Kummer et al.
5,527,309 A 6/1996 Shelton
5,536,269 A 7/1996 Spievack
5,549,610 A 8/1996 Russell et al.
5,573,012 A 11/1996 McEwan
5,575,790 A 11/1996 Chen et al.
5,582,616 A 12/1996 Bolduc et al.
5,620,445 A 4/1997 Brosnahan et al.
5,620,449 A 4/1997 Faccioli et al.
5,626,579 A 5/1997 Muschler et al.
5,626,613 A 5/1997 Schmieding
5,632,744 A 5/1997 Campbell, Jr.
5,659,217 A 8/1997 Petersen
5,662,683 A 9/1997 Kay
5,672,175 A 9/1997 Martin
5,672,177 A 9/1997 Seldin
5,700,263 A 12/1997 Schendel
5,704,938 A 1/1998 Staehlin et al.
5,704,939 A 1/1998 Justin
5,720,746 A 2/1998 Soubeiran
5,743,910 A 4/1998 Bays et al.
5,762,599 A 6/1998 Sohn
5,771,903 A 6/1998 Jakobsson
5,810,815 A 9/1998 Morales
5,827,286 A 10/1998 Incavo et al.
5,830,221 A 11/1998 Stein et al.
5,879,375 A 3/1999 Larson, Jr. et al.
5,902,304 A 5/1999 Walker et al.
5,935,127 A 8/1999 Border
5,945,762 A 8/1999 Chen et al.
5,961,553 A 10/1999 Coty et al.
5,976,138 A 11/1999 Baumgart et al.
5,979,456 A 11/1999 Magovern
5,983,424 A 11/1999 Näslund

(56) References Cited

U.S. PATENT DOCUMENTS 6,022,349 A 2/2000 McLeod et al.
6,033,412 A 3/2000 Losken et al.
6,034,296 A 3/2000 Elvin et al.
6,102,922 A 8/2000 Jakobsson et al.
6,106,525 A 8/2000 Sachse
6,126,660 A 10/2000 Dietz
6,126,661 A 10/2000 Faccioli et al.
6,138,681 A 10/2000 Chen et al.
6,139,316 A 10/2000 Sachdeva et al.
6,162,223 A 12/2000 Orsak et al.
6,183,476 B1 2/2001 Gerhardt et al.
6,200,317 B1 3/2001 Aalsma et al.
6,234,956 B1 5/2001 He et al.
6,241,730 B1 6/2001 Alby
6,243,897 B1 * 6/2001 Sumiya .................. A61H 1/003 5/624
6,245,075 B1 6/2001 Betz et al.
6,308,712 B1 10/2001 Shaw
6,315,784 B1 11/2001 Djurovic
6,319,255 B1 11/2001 Grundei et al.
6,331,744 B1 12/2001 Chen et al.
6,336,929 B1 1/2002 Justin
6,343,568 B1 2/2002 McClasky
6,353,949 B1 * 3/2002 Falbo ..................... A61G 13/04 5/624
6,358,283 B1 3/2002 Hogfors et al.
6,375,682 B1 4/2002 Fleischmann et al.
6,389,187 B1 5/2002 Greenaway et al.
6,400,980 B1 6/2002 Lemelson
6,402,753 B1 6/2002 Cole et al.
6,409,175 B1 6/2002 Evans et al.
6,416,516 B1 7/2002 Stauch et al.
6,428,497 B1 * 8/2002 Crouch ................ A61H 1/0222 5/624
6,499,907 B1 12/2002 Baur
6,500,110 B1 12/2002 Davey et al.
6,508,820 B2 1/2003 Bales
6,510,345 B1 1/2003 Van Bentem
6,537,196 B1 3/2003 Creighton, IV et al.
6,554,831 B1 4/2003 Rivard et al.
6,565,573 B1 5/2003 Ferrante et al.
6,565,576 B1 5/2003 Stauch et al.
6,582,313 B2 6/2003 Perrow
6,583,630 B2 6/2003 Mendes et al.
6,616,669 B2 9/2003 Ogilvie et al.
6,626,917 B1 9/2003 Craig
6,656,135 B2 12/2003 Zogbi et al.
6,656,194 B1 12/2003 Gannoe et al.
6,667,725 B1 12/2003 Simons et al.
6,673,079 B1 1/2004 Kane
6,702,816 B2 3/2004 Buhler
6,706,042 B2 3/2004 Taylor
6,709,293 B2 3/2004 Mori et al.
6,730,087 B1 5/2004 Butsch
6,761,503 B2 7/2004 Breese
6,769,499 B2 8/2004 Cargill et al.
6,789,442 B2 9/2004 Forch
6,796,984 B2 9/2004 Soubeiran
6,802,844 B2 10/2004 Ferree
6,809,434 B1 10/2004 Duncan et al.
6,835,207 B2 12/2004 Zacouto et al.
6,852,113 B2 2/2005 Nathanson et al.
6,918,838 B2 7/2005 Schwarzler et al.
6,918,910 B2 7/2005 Smith et al.
6,921,400 B2 7/2005 Sohngen
6,923,951 B2 8/2005 Contag et al.
6,971,143 B2 12/2005 Domroese
7,001,346 B2 2/2006 White
7,008,425 B2 3/2006 Phillips
7,011,658 B2 3/2006 Young
7,029,472 B1 4/2006 Fortin
7,029,475 B2 4/2006 Panjabi
7,041,105 B2 5/2006 Michelson
7,060,080 B2 6/2006 Bachmann
7,063,706 B2 6/2006 Wittenstein
7,105,029 B2 9/2006 Doubler et al.
7,105,968 B2 9/2006 Nissen
7,114,501 B2 10/2006 Johnson et al.
7,115,129 B2 10/2006 Heggeness
7,135,022 B2 11/2006 Kosashvili et al.
7,160,312 B2 1/2007 Saadat
7,163,538 B2 1/2007 Altarac et al.
7,189,005 B2 3/2007 Ward
7,191,007 B2 3/2007 Desai et al.
7,218,232 B2 5/2007 DiSilvestro et al.
7,238,191 B2 7/2007 Bachmann
7,241,300 B2 7/2007 Sharkawy et al.
7,243,719 B2 7/2007 Baron et al.
7,255,682 B1 8/2007 Bartol, Jr. et al.
7,282,023 B2 10/2007 Frering
7,285,087 B2 10/2007 Moaddeb et al.
7,302,015 B2 11/2007 Kim et al.
7,302,858 B2 12/2007 Walsh et al.
7,314,443 B2 1/2008 Jordan et al.
7,333,013 B2 2/2008 Berger
7,357,037 B2 4/2008 Hnat et al.
7,357,635 B2 4/2008 Belfor et al.
7,360,542 B2 4/2008 Nelson et al.
7,361,128 B2 4/2008 Chen
7,390,007 B2 6/2008 Helms et al.
7,390,294 B2 6/2008 Hassler, Jr.
7,402,134 B2 7/2008 Moaddeb et al.
7,402,176 B2 7/2008 Malek
7,429,259 B2 9/2008 Cadeddu et al.
7,445,010 B2 11/2008 Kugler et al.
7,458,981 B2 12/2008 Fielding et al.
7,485,149 B1 2/2009 White
7,489,495 B2 2/2009 Stevenson
7,530,981 B2 5/2009 Kutsenko
7,531,002 B2 5/2009 Sutton et al.
7,553,298 B2 6/2009 Hunt et al.
7,561,916 B2 7/2009 Hunt et al.
7,611,526 B2 11/2009 Carl et al.
7,618,435 B2 11/2009 Opolski
7,658,754 B2 2/2010 Zhang et al.
7,666,184 B2 2/2010 Stauch
7,666,210 B2 2/2010 Franck et al.
7,678,136 B2 3/2010 Doubler et al.
7,678,139 B2 3/2010 Garamszegi et al.
7,708,737 B2 5/2010 Kraft et al.
7,708,762 B2 5/2010 McCarthy et al.
7,727,143 B2 6/2010 Birk et al.
7,753,913 B2 7/2010 Szakelyhidi, Jr. et al.
7,753,915 B1 7/2010 Eksler et al.
7,762,998 B2 7/2010 Birk et al.
7,763,080 B2 7/2010 Southworth
7,766,855 B2 8/2010 Miethke
7,775,215 B2 8/2010 Hassler, Jr. et al.
7,776,068 B2 8/2010 Ainsworth et al.
7,776,075 B2 8/2010 Bruneau et al.
7,787,958 B2 8/2010 Stevenson
7,794,476 B2 9/2010 Wisnewski
7,811,328 B2 10/2010 Molz, IV et al.
7,835,779 B2 11/2010 Anderson et al.
7,837,691 B2 11/2010 Cordes et al.
7,862,586 B2 1/2011 Malek
7,867,235 B2 1/2011 Fell et al.
7,875,033 B2 1/2011 Richter et al.
7,901,381 B2 3/2011 Birk et al.
7,909,852 B2 3/2011 Boomer et al.
7,918,844 B2 4/2011 Byrum et al.
7,938,841 B2 5/2011 Sharkawy et al.
7,985,256 B2 7/2011 Grotz et al.
7,988,709 B2 8/2011 Clark et al.
8,002,809 B2 8/2011 Baynham
8,011,308 B2 9/2011 Picchio
8,034,080 B2 10/2011 Malandain et al.
8,043,299 B2 10/2011 Conway
8,043,338 B2 10/2011 Dant
8,057,473 B2 11/2011 Orsak et al.
8,057,513 B2 11/2011 Kohm et al.
8,083,741 B2 12/2011 Morgan et al.
8,092,499 B1 1/2012 Roth
8,095,317 B2 1/2012 Ekseth et al.

(56) References Cited

U.S. PATENT DOCUMENTS 8,105,360 B1 1/2012 Connor
8,114,158 B2 2/2012 Carl et al.
8,123,805 B2 2/2012 Makower et al.
8,133,280 B2 3/2012 Voellmicke et al.
8,147,549 B2 4/2012 Metcalf, Jr. et al.
8,162,897 B2 4/2012 Byrum
8,162,979 B2 4/2012 Sachs et al.
8,177,789 B2 5/2012 Magill et al.
8,197,490 B2 6/2012 Pool et al.
8,211,149 B2 7/2012 Justis
8,211,151 B2 7/2012 Schwab et al.
8,221,420 B2 7/2012 Keller
8,226,690 B2 7/2012 Altarac et al.
8,236,002 B2 8/2012 Fortin et al.
8,241,331 B2 8/2012 Arnin
8,246,630 B2 8/2012 Manzi et al.
8,252,063 B2 8/2012 Stauch
8,267,969 B2 9/2012 Altarac et al.
8,278,941 B2 10/2012 Kroh et al.
8,282,671 B2 10/2012 Connor
8,323,290 B2 12/2012 Metzger et al.
8,357,182 B2 1/2013 Seme
8,366,628 B2 2/2013 Denker et al.
8,372,078 B2 2/2013 Collazo
8,386,018 B2 2/2013 Stauch et al.
8,394,124 B2 3/2013 Biyani
8,403,958 B2 3/2013 Schwab
8,414,584 B2 4/2013 Brigido
8,425,608 B2 4/2013 Dewey et al.
8,435,268 B2 5/2013 Thompson et al.
8,439,926 B2 5/2013 Bojarski et al.
8,444,693 B2 5/2013 Reiley
8,469,908 B2 6/2013 Asfora
8,470,004 B2 6/2013 Reiley
8,486,070 B2 7/2013 Morgan et al.
8,486,076 B2 7/2013 Chavarria et al.
8,486,147 B2 7/2013 De Villiers et al.
8,494,805 B2 7/2013 Roche et al.
8,496,662 B2 7/2013 Novak et al.
8,518,062 B2 8/2013 Cole et al.
8,523,866 B2 9/2013 Sidebotham et al.
8,529,474 B2 9/2013 Gupta et al.
8,529,606 B2 9/2013 Alamin et al.
8,529,607 B2 9/2013 Alamin et al.
8,556,901 B2 10/2013 Anthony et al.
8,556,911 B2 10/2013 Mehta et al.
8,556,975 B2 10/2013 Ciupik et al.
8,562,653 B2 10/2013 Alamin et al.
8,568,457 B2 10/2013 Hunziker
8,617,220 B2 10/2013 Skaggs
8,579,979 B2 11/2013 Edie et al.
8,585,595 B2 11/2013 Heilman
8,585,740 B1 11/2013 Ross et al.
8,591,549 B2 11/2013 Lange
8,591,553 B2 11/2013 Eisermann et al.
8,613,758 B2 12/2013 Linares
8,623,036 B2 1/2014 Harrison et al.
8,632,544 B2 1/2014 Haaja et al.
8,632,548 B2 1/2014 Soubeiran
8,632,563 B2 1/2014 Nagase et al.
8,636,771 B2 1/2014 Butler et al.
8,636,802 B2 1/2014 Serhan et al.
8,641,719 B2 2/2014 Gephart et al.
8,641,723 B2 2/2014 Connor
8,657,856 B2 2/2014 Gephart et al.
8,663,285 B2 3/2014 Dall et al.
8,663,287 B2 3/2014 Butler et al.
8,668,719 B2 3/2014 Alamin et al.
8,709,090 B2 4/2014 Makower et al.
8,758,347 B2 6/2014 Weiner et al.
8,758,355 B2 6/2014 Fisher et al.
8,771,272 B2 7/2014 LeCronier et al.
8,777,947 B2 7/2014 Zahrly et al.
8,777,995 B2 7/2014 McClintock et al.
8,790,343 B2 7/2014 McClellan et al.
8,790,409 B2 7/2014 Van den Heuvel et al.
8,828,058 B2 9/2014 Elsebaie et al.
8,828,087 B2 9/2014 Stone et al.
8,840,651 B2 9/2014 Reiley
8,870,881 B2 10/2014 Rezach et al.
8,870,959 B2 10/2014 Arnin
8,915,915 B2 12/2014 Harrison et al.
8,915,917 B2 12/2014 Doherty et al.
8,920,422 B2 12/2014 Homeier et al.
8,945,188 B2 2/2015 Rezach et al.
8,961,521 B2 2/2015 Keefer et al.
8,961,567 B2 2/2015 Hunziker
8,968,402 B2 3/2015 Myers et al.
8,992,527 B2 3/2015 Guichet
9,022,917 B2 5/2015 Kasic et al.
9,044,218 B2 6/2015 Young
9,060,810 B2 6/2015 Kercher et al.
9,078,703 B2 7/2015 Arnin
9,662,260 B2 * 5/2017 Bervian ............... A61H 1/0292
11,278,462 B2 3/2022 Schwardt et al.
2002/0050112 A1 5/2002 Koch et al.
2002/0072758 A1 6/2002 Reo et al.
2002/0157186 A1 * 10/2002 VanSteenburg ........ A61G 13/04
5/621
2002/0164905 A1 11/2002 Bryant
2003/0040671 A1 2/2003 Somogyi et al.
2003/0144669 A1 7/2003 Robinson
2003/0220643 A1 11/2003 Ferree
2003/0220644 A1 11/2003 Thelen et al.
2004/0011137 A1 1/2004 Hnat et al.
2004/0011365 A1 1/2004 Govari et al.
2004/0019353 A1 1/2004 Freid et al.
2004/0023623 A1 2/2004 Stauch et al.
2004/0055610 A1 3/2004 Forsell
2004/0133219 A1 7/2004 Forsell
2004/0138725 A1 7/2004 Forsell
2004/0193266 A1 9/2004 Meyer
2005/0034705 A1 2/2005 McClendon
2005/0049617 A1 3/2005 Chatlynne et al.
2005/0065529 A1 3/2005 Liu et al.
2005/0090823 A1 4/2005 Bartimus
2005/0120479 A1 6/2005 Habashi et al.
2005/0159754 A1 7/2005 Odrich
2005/0234448 A1 10/2005 McCarthy
2005/0234462 A1 10/2005 Hershberger
2005/0246034 A1 11/2005 Soubeiran
2005/0261779 A1 11/2005 Meyer
2005/0272976 A1 12/2005 Tanaka et al.
2006/0004459 A1 1/2006 Hazebrouck et al.
2006/0009767 A1 1/2006 Kiester
2006/0036259 A1 2/2006 Carl et al.
2006/0036323 A1 2/2006 Carl et al.
2006/0036324 A1 2/2006 Sachs et al.
2006/0047282 A1 3/2006 Gordon
2006/0058792 A1 3/2006 Hynes
2006/0069447 A1 3/2006 DiSilvestro et al.
2006/0074448 A1 4/2006 Harrison et al.
2006/0079897 A1 4/2006 Harrison et al.
2006/0136062 A1 6/2006 DiNello et al.
2006/0142767 A1 6/2006 Green et al.
2006/0155279 A1 7/2006 Ogilvie
2006/0195087 A1 8/2006 Sacher et al.
2006/0195088 A1 8/2006 Sacher et al.
2006/0200134 A1 9/2006 Freid et al.
2006/0204156 A1 9/2006 Takehara et al.
2006/0235299 A1 10/2006 Martinelli
2006/0235424 A1 10/2006 Vitale et al.
2006/0241746 A1 10/2006 Shaoulian et al.
2006/0241767 A1 10/2006 Doty
2006/0249914 A1 11/2006 Dulin
2006/0271107 A1 11/2006 Harrison et al.
2006/0282073 A1 12/2006 Simanovsky
2006/0293683 A1 12/2006 Stauch
2007/0010814 A1 1/2007 Stauch
2007/0010887 A1 1/2007 Williams et al.
2007/0021644 A1 1/2007 Woolson et al.
2007/0031131 A1 2/2007 Griffitts
2007/0043376 A1 2/2007 Leatherbury et al.
2007/0050030 A1 3/2007 Kim

(56) References Cited

U.S. PATENT DOCUMENTS

2007/0118215 A1 5/2007 Moaddeb
2007/0161984 A1 7/2007 Cresina et al.
2007/0173837 A1 7/2007 Chan et al.
2007/0179493 A1 8/2007 Kim
2007/0185374 A1 8/2007 Kick et al.
2007/0189461 A1 8/2007 Sommer
2007/0233098 A1 10/2007 Mastrorio et al.
2007/0239159 A1 10/2007 Altarac et al.
2007/0239161 A1 10/2007 Giger et al.
2007/0255088 A1 11/2007 Jacobson et al.
2007/0270803 A1 11/2007 Giger et al.
2007/0276368 A1 11/2007 Trieu et al.
2007/0276369 A1 11/2007 Allard et al.
2007/0276373 A1 11/2007 Malandain
2007/0276378 A1 11/2007 Harrison et al.
2007/0276493 A1 11/2007 Malandain et al.
2007/0288024 A1 12/2007 Gollogly
2007/0288183 A1 12/2007 Bulkes et al.
2008/0009792 A1 1/2008 Henniges et al.
2008/0015577 A1 1/2008 Loeb
2008/0021454 A1 1/2008 Chao et al.
2008/0021455 A1 1/2008 Chao et al.
2008/0021456 A1 1/2008 Gupta et al.
2008/0027436 A1 1/2008 Cournoyer et al.
2008/0033431 A1 2/2008 Jung et al.
2008/0033436 A1 2/2008 Song et al.
2008/0051784 A1 2/2008 Gollogly
2008/0082118 A1 4/2008 Edidin et al.
2008/0086128 A1 4/2008 Lewis
2008/0097487 A1 4/2008 Pool et al.
2008/0097496 A1 4/2008 Chang et al.
2008/0108995 A1 5/2008 Conway et al.
2008/0161933 A1 7/2008 Grotz et al.
2008/0167685 A1 7/2008 Allard et al.
2008/0172063 A1 7/2008 Taylor
2008/0176714 A1 7/2008 Boren
2008/0177319 A1 7/2008 Schwab
2008/0177326 A1 7/2008 Thompson
2008/0190237 A1 8/2008 Radinger et al.
2008/0228186 A1 9/2008 Gall et al.
2008/0255615 A1 10/2008 Vittur et al.
2008/0269030 A1 10/2008 Hoffman et al.
2008/0272928 A1 11/2008 Shuster
2008/0275557 A1 11/2008 Makower et al.
2009/0030462 A1 1/2009 Buttermann
2009/0076597 A1 3/2009 Dahlgren et al.
2009/0082815 A1 3/2009 Zylber et al.
2009/0088803 A1 4/2009 Justis et al.
2009/0093820 A1 4/2009 Trieu et al.
2009/0093890 A1 4/2009 Gelbart
2009/0112263 A1 4/2009 Pool et al.
2009/0163780 A1 6/2009 Tieu
2009/0171356 A1 7/2009 Klett
2009/0192514 A1 7/2009 Feinberg et al.
2009/0198144 A1 8/2009 Phillips et al.
2009/0216113 A1 8/2009 Meier et al.
2009/0275984 A1 11/2009 Kim et al.
2009/0300845 A1* 12/2009 Paz ........................ A61G 7/015
5/610
2010/0004654 A1 1/2010 Schmitz et al.
2010/0057127 A1 3/2010 McGuire et al.
2010/0094306 A1 4/2010 Chang et al.
2010/0100185 A1 4/2010 Trieu et al.
2010/0106192 A1 4/2010 Barry
2010/0114322 A1 5/2010 Clifford et al.
2010/0130941 A1 5/2010 Conlon et al.
2010/0137872 A1 6/2010 Kam et al.
2010/0145449 A1 6/2010 Makower et al.
2010/0145462 A1 6/2010 Ainsworth et al.
2010/0147314 A1 6/2010 Lees
2010/0168751 A1 7/2010 Anderson et al.
2010/0217271 A1 8/2010 Pool et al.
2010/0249782 A1 9/2010 Durham
2010/0256626 A1 10/2010 Muller et al.
2010/0262239 A1 10/2010 Boyden et al.
2010/0318129 A1 12/2010 Seme et al.
2010/0331883 A1 12/2010 Schmitz et al.
2011/0004076 A1 1/2011 Janna et al.
2011/0057756 A1 3/2011 Marinescu et al.
2011/0066188 A1 3/2011 Seme et al.
2011/0098748 A1 4/2011 Jangra
2011/0152725 A1 6/2011 Demir et al.
2011/0196435 A1 8/2011 Forsell
2011/0202138 A1 8/2011 Shenoy et al.
2011/0230883 A1 9/2011 Zahrly et al.
2011/0238126 A1 9/2011 Soubeiran
2011/0257655 A1 10/2011 Copf, Jr.
2011/0284014 A1 11/2011 Cadeddu et al.
2012/0004494 A1 1/2012 Payne et al.
2012/0019341 A1 1/2012 Gabay et al.
2012/0019342 A1 1/2012 Gabay et al.
2012/0053633 A1 3/2012 Stauch
2012/0088953 A1 4/2012 King
2012/0109207 A1 5/2012 Trieu
2012/0116535 A1 5/2012 Ratron et al.
2012/0158061 A1 6/2012 Koch et al.
2012/0172883 A1 7/2012 Sayago
2012/0179215 A1 7/2012 Soubeiran
2012/0221106 A1 8/2012 Makower et al.
2012/0271353 A1 10/2012 Barry
2012/0296234 A1 11/2012 Wilhelm et al.
2012/0329882 A1 12/2012 Messersmith et al.
2013/0013066 A1 1/2013 Landry et al.
2013/0072932 A1 3/2013 Stauch
2013/0123847 A1 5/2013 Anderson et al.
2013/0138017 A1 5/2013 Jundt et al.
2013/0138154 A1 5/2013 Reiley
2013/0150863 A1 6/2013 Baumgartner
2013/0150889 A1 6/2013 Fening et al.
2013/0178903 A1 7/2013 Abdou
2013/0211521 A1 8/2013 Shenoy et al.
2013/0245692 A1 9/2013 Hayes et al.
2013/0253344 A1 9/2013 Griswold et al.
2013/0253587 A1 9/2013 Carls et al.
2013/0261672 A1 10/2013 Horvath
2013/0296863 A1 11/2013 Globerman et al.
2013/0296864 A1 11/2013 Burley et al.
2013/0296940 A1 11/2013 Northcutt et al.
2013/0325006 A1 12/2013 Michelinie et al.
2013/0325071 A1 12/2013 Niemiec et al.
2014/0005788 A1 1/2014 Haaja et al.
2014/0025172 A1 1/2014 Lucas et al.
2014/0052134 A1 2/2014 Orisek
2014/0058392 A1 2/2014 Mueckter et al.
2014/0058450 A1 2/2014 Arlet
2014/0066987 A1 3/2014 Hestad et al.
2014/0088715 A1 3/2014 Ciupik
2014/0128920 A1 5/2014 Kantelhardt
2014/0163664 A1 6/2014 Goldsmith
2014/0236234 A1 8/2014 Kroll et al.
2014/0236311 A1 8/2014 Vicatos et al.
2014/0245537 A1* 9/2014 Allen ..................... A61G 13/04
5/622
2014/0257412 A1 9/2014 Patty et al.
2014/0277446 A1 9/2014 Clifford et al.
2014/0296918 A1 10/2014 Fening et al.
2014/0303538 A1 10/2014 Baym et al.
2014/0303539 A1 10/2014 Baym et al.
2014/0338129 A1* 11/2014 Mitchell ................ A61G 7/018
5/610
2014/0358150 A1 12/2014 Kaufman et al.
2015/0032109 A1 1/2015 Pool et al.
2015/0105782 A1 4/2015 D'Lima et al.
2015/0105824 A1 4/2015 Moskowitz et al.
2015/0196332 A1 7/2015 Pool et al.
2015/0313745 A1 11/2015 Cheng
2016/0287458 A1 10/2016 Skursky
2017/0252253 A1 9/2017 Kim
2021/0386606 A1 12/2021 Campagna

FOREIGN PATENT DOCUMENTS

CN 202505467 U 10/2012
CN 204744374 U 11/2015

(56) References Cited

FOREIGN PATENT DOCUMENTS

| | | | |
|---|---|---|---|
| DE | 1541262 | A1 | 6/1969 |
| DE | 8515687 | U1 | 12/1985 |
| DE | 19626230 | A1 | 1/1998 |
| DE | 19745654 | A1 | 4/1999 |
| DE | 102005045070 | A1 | 4/2007 |
| DE | 213290 | | 11/2015 |
| EP | 0663184 | A1 | 7/1995 |
| EP | 1905388 | A1 | 4/2008 |
| FR | 2901991 | A1 | 12/2007 |
| FR | 2900563 | B1 | 8/2008 |
| FR | 2892617 | B1 | 9/2008 |
| FR | 2916622 | B1 | 9/2009 |
| FR | 2961386 | B1 | 12/2011 |
| GB | 1274470 | A | 5/1972 |
| JP | H0956736 | | 3/1997 |
| JP | 2002500063 | A | 1/2002 |
| WO | WO1998044858 | A1 | 10/1998 |
| WO | WO1999051160 | A1 | 10/1999 |
| WO | WO2001024697 | A1 | 4/2001 |
| WO | WO2001045485 | A3 | 6/2001 |
| WO | WO2001045487 | A2 | 6/2001 |
| WO | WO2001067973 | A2 | 9/2001 |
| WO | WO2001078614 | A1 | 10/2001 |
| WO | 0234131 | A1 | 5/2002 |
| WO | WO2007013059 | A3 | 2/2007 |
| WO | WO2007015239 | A3 | 2/2007 |
| WO | WO2011116158 | A3 | 9/2011 |
| WO | WO2013119528 | A1 | 8/2013 |
| WO | WO2014040013 | A1 | 3/2014 |
| WO | 2014070681 | A1 | 5/2014 |

OTHER PUBLICATIONS

Ahlbom et al., "Guidelines for limiting exposure to time-varying electric, magnetic, and electromagnetic fields (up to 300 GHz). International Commission on Non-Ionizing Radiation Protection.", Health Physics, 1998, pp. 494-522, 74, No. 4.

Amer et al., "Evaluation of treatment of late-onset tibia vara using gradual angulation translation high tibial osteotomy", ACTA Orthopaedica Belgica, 2010, pp. 360-366, 76, No. 3.

Angrisani et al., "Lap-Band® Rapid Port™ System: Preliminary results in 21 patients", Obesity Surgery, 2005, p. 936, 15, No. 7.

Baumgart et al., "A fully implantable, programmable distraction nail (Fitbone)—new perspectives for corrective and reconstructive limb surgery.", Practice of Intramedullary Locked Nails, 2006, pp. 189-198.

Baumgart et al., "The bioexpandable prosthesis: A new perspective after resection of malignant bone tumors in children.", J Pediatr Hematol Oncol, 2005, pp. 452-455, 27, No. 8.

Bodó et al., "Development of a tension-adjustable implant for anterior cruciate ligament reconstruction.", Eklem Hastaliklari ve Cerrahisi—Joint Diseases and Related Surgery, 2008, pp. 27-32, 19, No. 1.

Boudjemline et al., "Off-label use of an adjustable gastric banding system for pulmonary artery banding.", The Journal of Thoracic and Cardiovascular Surgery, 2006, pp. 1130-1135, 131, No. 5.

Brown et al., "Single port surgery and the Dundee Endocone.", SAGES Annual Scientific Sessions: Emerging Technology Poster Abstracts, 2007, ETP007, pp. 323-324.

Buchowski et al., "Temporary internal distraction as an aid to correction of severe scoliosis", J Bone Joint Surg Am, 2006, pp. 2035-2041, 88-A, No. 9.

Burghardt et al., "Mechanical failure of the Intramedullary Skeletal Kinetic Distractor in limb lengthening.", J Bone Joint Surg Br, 2011, pp. 639-643, 93-B, No. 5.

Burke, "Design of a minimally invasive non fusion device for the surgical management of scoliosis in the skeletally immature", Studies in Health Technology and Informatics, 2006, pp. 378-384, 123.

Carter et al., "A cumulative damage model for bone fracture.", Journal of Orthopaedic Research, 1985, pp. 84-90, 3, No. 1.

Chapman et al., "Laparoscopic adjustable gastric banding in the treatment of obesity: A systematic literature review.", Surgery, 2004, pp. 326-351, 135, No. 3.

Cole et al., "Operative technique intramedullary skeletal kinetic distractor: Tibial surgical technique.", Orthofix, 2005.

Cole et al., "The intramedullary skeletal kinetic distractor (ISKD): first clinical results of a new intramedullary nail for lengthening of the femur and tibia.", Injury, 2001, pp. S-D-129-S-D-139, 32.

Dailey et al., "A novel intramedullary nail for micromotion stimulation of tibial fractures.", Clinical Biomechanics, 2012, pp. 182-188, 27, No. 2.

Daniels et al., "A new method for continuous intraoperative measurement of Harrington rod loading patterns.", Annals of Biomedical Engineering, 1984, pp. 233-246, 12, No. 3.

De Giorgi et al., "Cotrel-Dubousset instrumentation for the treatment of severe scoliosis.", European Spine Journal, 1999, pp. 8-15, No. 1.

Dorsey et al., "The stability of three commercially available implants used in medial opening wedge high tibial osteotomy.", Journal of Knee Surgery, 2006, pp. 95-98, 19, No. 2.

Edeland et al., "Instrumentation for distraction by limited surgery in scoliosis treatment.", Journal of Biomedical Engineering, 1981, pp. 143-146, 3, No. 2.

Elsebaie, "Single growing rods (Review of 21 cases). Changing the foundations: Does it affect the results?", Journal of Child Orthop, 2007, 1:258.

Ember et al., "Distraction forces required during growth rod lengthening.", J of Bone Joint Surg BR, 2006, p. 229, 88-B, No. Suppl. II.

European Patent Office, "Observations by a third party under Article 115 EPC in EP08805612 by Soubeiran.", 2010.

Fabry et al., "A technique for prevention of port complications after laparoscopic adjustable silicone gastric banding.", Obesity Surgery, 2002, pp. 285-288, 12, No. 2.

Fried et al., "In vivo measurements of different gastric band pressures towards the gastric wall at the stoma region.", Obesity Surgery, 2004, p. 914, 14, No. 7.

Gao et al., CHD7 gene polymorphisms are associated with susceptibility to idiopathic scoliosis, American Journal of Human Genetics, 2007, pp. 957-965, 80.

Gebhart et al., "Early clinical experience with a custom made growing endoprosthesis in children with malignant bone tumors of the lower extremity actioned by an external permanent magnet; The Phenix M. system", International Society of Limb Salvage 14th International Symposium on Limb Salvage. Sep. 3, 2007, Hamburg, Germany. (2 pages).

Gillespie et al. "Harrington instrumentation without fusion.", J Bone Joint Surg Br, 1981, p. 461, 63-B, No. 3.

Goodship et al., "Strain rate and timing of stimulation in mechanical modulation of fracture healing.", Clinical Orthopaedics and Related Research, 1998, pp. S105-S115, No. 355S.

Grass et al., "Intermittent distracting rod for correction of high neurologic risk congenital scoliosis.", Spine, 1997, pp. 1922-1927, 22, No. 16.

Gray, "Gray's anatomy of the human body.", http://education.yahoo.com/reference/gray/subjects/subject/128, published Jul. 1, 2007.

Grimer et al. "Non-invasive extendable endoprostheses for children—Expensive but worth it!", International Society of Limb Salvage 14th International Symposium on Limb Salvage, 2007.

Grünert, "The development of a totally implantable electronic sphincter." (translated from the German "Die Entwicklung eines total implantierbaren elektronischen Sphincters"), Langenbecks Archiv fur Chirurgie, 1969, pp. 1170-1174, 325.

Guichet et al. "Gradual femoral lengthening with the Albizzia intramedullary nail", J Bone Joint Surg Am, 2003, pp. 838-848, 85-A, No. 5.

Gupta et al., "Non-invasive distal femoral expandable endoprosthesis for limb-salvage surgery in paediatric tumours.", J Bone Joint Surg Br, 2006, pp. 649-654, 88-B, No. 5.

Hankemeier et al., "Limb lengthening with the Intramedullary Skeletal Kinetic Distractor (ISKD).", Oper Orthop Traumatol, 2005, pp. 79-101, 17, No. 1.

(56) References Cited

OTHER PUBLICATIONS

Harrington, "Treatment of scoliosis. Correction and internal fixation by spine instrumentation.", J Bone Joint Surg Am, 1962, pp. 591-610, 44-A, No. 4.
Hennig et al., "The safety and efficacy of a new adjustable plate used for proximal tibial opening wedge osteotomy in the treatment of unicompartmental knee osteoarthrosis.", Journal of Knee Surgery, 2007, pp. 6-14, 20, No. 1.
Hofmeister et al., "Callus distraction with the Albizzia nail.", Practice of Intramedullary Locked Nails, 2006, pp. 211-215.
Horbach et al., "First experiences with the routine use of the Rapid Port™ system with the Lap-Band®.", Obesity Surgery, 2006, p. 418, 16, No. 4.
Hyodo et al., "Bone transport using intramedullary fixation and a single flexible traction cable.", Clinical Orthopaedics and Related Research, 1996, pp. 256-268, 325.
International Commission on Non-Ionizing Radiation Protection, "Guidelines on limits of exposure to static magnetic fields." Health Physics, 2009, pp. 504-514, 96, No. 4.
Invis®/Lamello Catalog, 2006, Article No. 68906A001 GB.
Kasliwal et al., "Management of high-grade spondylolisthesis.", Neurosurgery Clinics of North America, 2013, pp. 275-291, 24, No. 2.
Kenawey et al., "Leg lengthening using intramedullay skeletal kinetic distractor: Results of 57 consecutive applications.", Injury, 2011, pp. 150-155, 42, No. 2.
Kent et al., "Assessment and correction of femoral malrotation following intramedullary nailing of the femur.", Acta Orthop Belg, 2010, pp. 580-584, 76, No. 5.
Klemme et al., "Spinal instrumentation without fusion for progressive scoliosis in young children", Journal of Pediatric Orthopaedics. 1997, pp. 734-742, 17, No. 6.
Korenkov et al., "Port function after laparoscopic adjustable gastric banding for morbid obesity.", Surgical Endoscopy, 2003, pp. 1068-1071, 17, No. 7.
Krieg et al., "Leg lengthening with a motorized nail in adolescents.", Clinical Orthopaedics and Related Research, 2008, pp. 189-197, 466, No. 1.
Kucukkaya et al., "The new intramedullary cable bone transport technique.", Journal of Orthopaedic Trauma, 2009, pp. 531-536, 23, No. 7.
Lechner et al., "In vivo band manometry: A new method in band adjustment", Obesity Surgery, 2005, p. 935, 15, No. 7.
Lechner et al., "Intra-band manometry for band adjustments: The basics", Obesity Surgery, 2006, pp. 417-418, 16, No. 4.
Li et al., "Bone transport over an intramedullary nail: A case report with histologic examination of the regenerated segment.", Injury, 1999, pp. 525-534, 30, No. 8.
Lonner, "Emerging minimally invasive technologies for the management of scoliosis.", Orthopedic Clinics of North America, 2007, pp. 431-440, 38, No. 3.
Matthews et al., "Magnetically adjustable intraocular lens.", Journal of Cataract and Refractive Surgery, 2003, pp. 2211-2216, 29, No. 11.
Micromotion, "Micro Drive Engineering. General catalogue.", 2009, pp. 14-24.
Mineiro et al., "Subcutaneous rodding for progressive spinal curvatures: Early results.", Journal of Pediatric Orthopaedics, 2002, pp. 290-295, 22, No. 3.
Moe et al., "Harrington instrumentation without fusion plus external orthotic support for the treatment of difficult curvature problems in young children.", Clinical Orthopaedics and Related Research, 1984, pp. 35-45, 185.
Montague et al., "Magnetic gear dynamics for servo control.", Melecon 2010—2010 15th IEEE Mediterranean Electrotechnical Conference, Valletta, 2010, pp. 1192-1197.
Montague et al., "Servo control of magnetic gears.", IEEE/ASME Transactions on Mechatronics, 2012, pp. 269-278, 17, No. 2.
Nachemson et al., "Intravital wireless telemetry of axial forces in Harrington distraction rods in patients with idiopathic scoliosis.", The Journal of Bone and Joint Surgery, 1971, pp. 445-465, 53, No. 3.
Nachlas et al., "The cure of experimental scoliosis by directed growth control.", The Journal of Bone and Joint Surgery, 1951, pp. 24-34, 33-A, No. 1.
Newton et al., "Fusionless scoliosis correction by anterolateral tethering . . . can it work ?.", 39th Annual Scoliosis Research Society Meeting, 2004.
Oh et al., "Bone transport over an intramedullary nail for reconstruction of long bone defects in tibia.", Archives of Orthopaedic and Trauma Surgery, 2008, pp. 801-808, 128, No. 8.
Ozcivici et al., "Mechanical signals as anabolic agents in bone.", Nature Reviews Rheumatology, 2010, pp. 50-59, 6, No. 1.
Piorkowski et al., Preventing Port Site Inversion in Laparoscopic Adjustable Gastric Banding, Surgery for Obesity and Related Diseases, 2007, 3(2), pp. 159-162, Elsevier; New York, U.S.A.
Prontes, "Longest bone in body.", eHow.com, 2012.
Rathjen et al., "Clinical and radiographic results after implant removal in idiopathic scoliosis.", Spine, 2007, pp. 2184-2188, 32, No. 20.
Ren et al., "Laparoscopic adjustable gastric banding: Surgical technique", Journal of Laparoendoscopic & Advanced Surgical Techniques, 2003, pp. 257-263, 13, No. 4.
Reyes-Sanchez et al., "External fixation for dynamic correction of severe scoliosis", The Spine Journal, 2005, pp. 418-426, 5, No. 4.
Rinsky et al., "Segmental instrumentation without fusion in children with progressive scoliosis.", Journal of Pediatric Orthopedics, 1985, pp. 687-690, 5, No. 6.
Rode et al., "A simple way to adjust bands under radiologic control", Obesity Surgery, 2006, p. 418, 16, No. 4.
Schmerling et al., "Using the shape recovery of nitinol in the Harrington rod treatment of scoliosis.", Journal of Biomedical Materials Research, 1976, pp. 879-892, 10, No. 6.
Scott et al., "Transgastric, transcolonic and transvaginal cholecystectomy using magnetically anchored instruments.", SAGES Annual Scientific Sessions, Poster Abstracts, Apr. 18-22, 2007, P511, p. 306.
Sharke, "The machinery of life", Mechanical Engineering Magazine, Feb. 2004, Printed from Internet site Oct. 24, 2007 http://www.memagazine.org/contents/current/features/moflife/moflife.html.
Shiha et al., "Ilizarov gradual correction of genu varum deformity in adults.", Acta Orthop Belg, 2009, pp. 784-791, 75, No. 6.
Simpson et al., "Femoral lengthening with the intramedullary skeletal kinetic distractor.", Journal of Bone and Joint Surgery, 2009, pp. 955-961, 91-B, No. 7.
Smith, "The use of growth-sparing instrumentation in pediatric spinal deformity.", Orthopedic Clinics of North America, 2007, pp. 547-552, 38, No. 4.
Soubeiran et al. "The Phenix M System, a fully implanted non-invasive lengthening device externally controllable through the skin with a palm size permanent magnet. Applications in limb salvage." International Society of Limb Salvage 14th International Symposium on Limb Salvage, Sep. 13, 2007, Hamburg, Germany. (2 pages).
Soubeiran et al., "The Phenix M System. A fully implanted lengthening device externally controllable through the skin with a palm size permanent magnet; Applications to pediatric orthopaedics", 6th European Research Conference in Pediatric Orthopaedics, Oct. 6, 2006, Toulouse, France (7 pages).
Stokes et al., "Reducing radiation exposure in early-onset scoliosis surgery patients: Novel use of ultrasonography to measure lengthening in magnetically-controlled growing rods. Prospective validation study and assessment of clinical algorithm", 20th International Meeting on Advanced Spine Techniques, Jul. 11, 2013. Vancouver, Canada. Scoliosis Research Society.
Sun et al., "Masticatory mechanics of a mandibular distraction osteogenesis site: Interfragmentary micromovement.", Bone, 2007, pp. 188-196, 41, No. 2.
Synthes Spine, "VEPTR II. Vertical Expandable Prosthetic Titanium Rib II: Technique Guide.", 2008, 40 pgs.
Synthes Spine, "VEPTR Vertical Expandable Prosthetic Titanium Rib, Patient Guide.", 2005, 26 pgs.

(56) References Cited

OTHER PUBLICATIONS

Takaso et al., "New remote-controlled growing-rod spinal instrumentation possibly applicable for scoliosis in young children.", Journal of Orthopaedic Science, 1998, pp. 336-340, 3, No. 6.
Teli et al., "Measurement of forces generated during distraction of growing rods.", Journal of Children's Orthopaedics, 2007, pp. 257-258, 1, No. 4.
Tello, "Harrington instrumentation without arthrodesis and consecutive distraction program for young children with severe spinal deformities: Experience and technical details.", The Orthopedic Clinics of North America, 1994, pp. 333-351, 25, No. 2.
Thaller et al., "Limb lengthening with fully implantable magnetically actuated mechanical nails (PHENIX®)—Preliminary results.", Injury, 2014 (E-published Oct. 28, 2013), pp. S60-S65, 45.
Thompson et al., "Early onset scoliosis: Future directions", 2007, J Bone Joint Surg Am, pp. 163-166, 89-A, Suppl 1.
Thompson et al., "Growing rod techniques in early-onset scoliosis", Journal of Pediatric Orthopedics, 2007, pp. 354-361, 27, No. 3.
Thonse et al., "Limb lengthening with a fully implantable, telescopic, intramedullary nail.", Operative Techniques in Orthopedics, 2005, pp. 355-362, 15, No. 4.
Trias et al., "Dynamic loads experienced in correction of idiopathic scoliosis using two types of Harrington rods.", Spine, 1979, pp. 228-235, 4, No. 3.
Verkerke et al., "An extendable modular endoprosthetic system for bone tumor management in the leg", Journal of Biomedical Engineering, 1990, pp. 91-96, 12, No. 2.
Verkerke et al., "Design of a lengthening element for a modular femur endoprosthetic system", Proceedings of the Institution of Mechanical Engineers Part H: Journal of Engineering in Medicine, 1989, pp. 97-102, 203, No. 2.
Verkerke et al., "Development and test of an extendable endoprosthesis for bone reconstruction in the leg.", The International Journal of Artificial Organs, 1994, pp. 155-162, 17, No. 3.
Weiner et al., "Initial clinical experience with telemetrically adjustable gastric banding", Surgical Technology International, 2005, pp. 63-69, 15.
Wenger, "Spine jack operation in the correction of scoliotic deformity: A direct intrathoracic attack to straighten the laterally bent spine: Preliminary report", Arch Surg, 1961, pp. 123-132 (901-910), 83, No. 6.
White, III et al., "The clinical biomechanics of scoliosis.", Clinical Orthopaedics and Related Research, 1976, pp. 100-112, 118.
Yonnet, "A new type of permanent magnet coupling.", IEEE Transactions on Magnetics, 1981, pp. 2991-2993, 17, No. 6.
Yonnet, "Passive magnetic bearings with permanent magnets.", IEEE Transactions on Magnetics, 1978, pp. 803-805, 14, No. 5.
Zheng et al., "Force and torque characteristics for magnetically driven blood pump.", Journal of Magnetism and Magnetic Materials, 2002, pp. 292-302, 241, No. 2.

* cited by examiner

SYSTEMS AND METHODS FOR CONTROLLING MULTIPLE SURGICAL VARIABLES

CROSS REFERENCE TO RELATED APPLICATIONS

This application is a continuation of U.S. patent application Ser. No. 17/689,471 filed on Mar. 8, 2022, which is a continuation of U.S. patent application Ser. No. 16/058,750 filed on Aug. 8, 2018, now U.S. Pat. No. 11,278,462, which is a continuation of PCT Application No. PCT/US17/17331 filed on Feb. 10, 2017, which claims the benefit of the priority from U.S. Provisional Patent Application No. 62/293,755 filed on Feb. 10, 2016, each of which is incorporated by reference in its entirely herein.

FIELD

The present disclosure relates generally to medical devices and surgical methods, more specifically to a patient support platform. Such devices as well as systems and methods for use therewith are described.

BACKGROUND

Millions of surgical procedures are performed in the U.S. alone every year. Patients undergoing surgery are positioned for preparation for surgery and/or during the surgical procedure. One of the more common ways a patient is positioned on an operating room table is by being freely placed in a supine position (i.e., lying horizontally with face and torso facing up) or a prone position (i.e., lying horizontally with face and torso facing down).

Many current surgical techniques were designed or have evolved to solve problems specific to the period of time in which the surgery occurs. Some of the factors that have been taken into account in the design of surgical techniques include: the maintenance and handling of the weight of a patient's body without significant movement; the maintenance of a sterile field; easy access by the hands of one or more surgeons or surgical assistants while maintaining safe, ergonomic body positioning of the surgeons or surgical assistants; ease of incorporation of imaging systems including radiographic, fluoroscopic, or other imaging systems; maintenance and continuous measurement of controlled blood pressure; maintenance and continuous measurement of other vital parameters, such as temperature, respiratory rate, heart rate and rhythm, EKG, blood oxygen saturation, anesthesia level, state of reflexes, interface with medical equipment, and many other others. Some of the surgical positions used include prone, supine, lateral, lithotomy, and variations of these positions, such as the Trendelenburg position, the reverse Trendelenburg position, the full or high Fowler's position, the semi-Fowler's position, the jackknife or Kraske position, the high and low lithotomy positions, the fracture table position, the knee-chest position, the Lloyd-Davies position, the kidney position, and the Sims' position.

However, a significant problem with current surgical systems and methods is that anatomical and physiological conditions normal to the patient, such as weight distribution when the patient is standing normally, are not present during preparation of surgery or during the surgical procedure. Thus, patients may experience post-operative problems when returning to normal (i.e., non-surgical) anatomical positions and physiology. Therefore, a need continues to exist for systems and methods for performing surgical procedures under physiological and anatomical conditions normally experienced by the patient in the course of the patient's normal daily activities (e.g., standing, sleeping, sitting).

SUMMARY

The needs described above, as well as others, are addressed by embodiments of the systems and methods for controlling multiple surgical variables described in this disclosure (although it is to be understood that not all needs described above will necessarily be addressed by any one embodiment), as the systems and methods of the present disclosure are separable into multiple pieces and can be used independently or in combination.

The present disclosure provides for a surgical patient interface including a patient support platform having a first end and a second end and configured for secure placement with respect to at least one surface of a building structure. The patient support platform is configured to interface with a patient such that at least the torso of the patient extends in a generally vertical direction between the first end and the second end of the patient support platform. One or more patient supports couple to the patient support platform and are configured to secure the patient to the patient support platform, such that the at least the torso of the patient is held in a substantially static condition, and such that a target portion of the patient's skin is accessible for surgical puncture or incision.

The present disclosure further provides for a method for performing surgery. The method includes placing a surgical patient in a patient support platform having a first end and a second end and configured for secure placement with respect to at least one surface of a building structure. The patient support platform is configured to interface with the patient such that at least the torso of the patient extends in a generally vertical direction between the first end and the second end of the patient support platform. The patient support platform includes one or more patient supports coupled thereto and configured to secure the patient to the patient support platform, such that the at least the torso of the patient is held in a substantially static condition, and such that a target portion of the patient's skin is accessible for surgical puncture or incision. The method includes using one or more of the one or more patient supports to secure the surgical patient to the patient support platform, and performing surgery on the patient.

DETAILED DESCRIPTION

Embodiments of the present invention provide systems and methods for performing surgery on a patient such that patient anatomical and/or physiological conditions preparing for and during surgery are more closely reproduced to reflect anatomical and/or physiological conditions during normal patient activities (e.g., standing, sitting, sleeping) than current standard surgical techniques. Advantageously, the systems and methods of the present disclosure are capable of being used in conjunction with many current surgical positions. For example, the systems and methods of the present disclosure can be used with a patient placed in a prone position, which is used in a large percent of thoracic, lumbar, and sacral spine surgeries.

Figure 1:
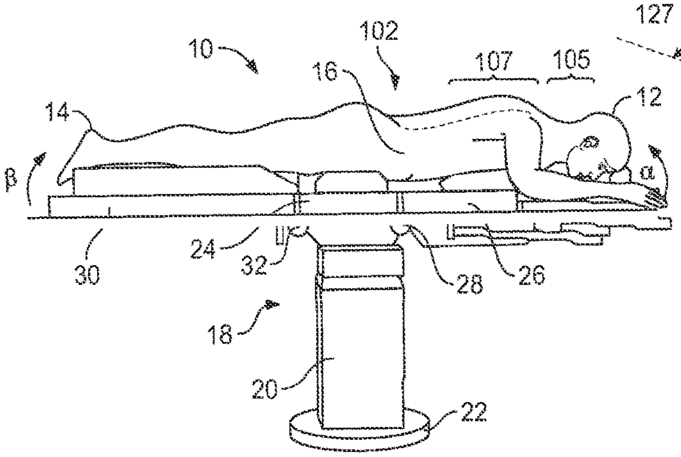
FIG. 1. A perspective view of a patient in a supine position on an embodiment of a surgical table.

A surgical patient 10 is shown in FIG. 1 in a prone position on a surgical table 18, with the patient's head 12 and feet 14 extending generally horizontally in opposite directions from the patient's torso 16. In the prone position, the patient's dorsal side is facing up and the patient's ventral side is facing down. The surgical table 18 may include a base 20 having a floor interface 22 and a patient support platform 24 extending in a horizontal, or generally horizontal, direction with respect to the base 20. The base 20 may be vertical, or generally vertical. A first adjustable platform portion 26 may extend horizontally, or generally horizontally, from the platform 24 and may be tilted by angle α around a first pivot 28. Similarly, a second adjustable platform portion 30 may extend horizontally, or generally horizontally, from the platform and oppositely from the first adjustment platform portion 24, and may be tilted by angle R around a second pivot 32.

Figure 2:
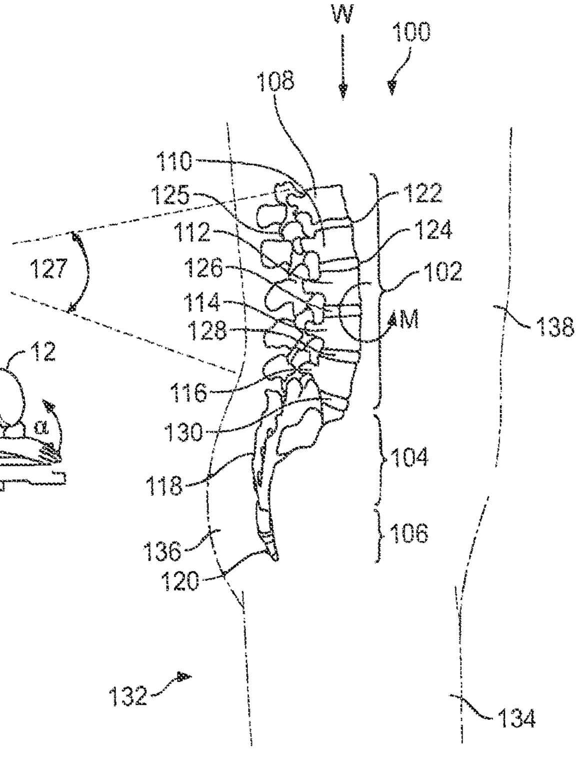
FIG. 2. A cross-sectional view of a portion of a vertebral column.

FIG. 2 illustrates a sagittal plane view of a portion of a vertebral column 100. As depicted, the vertebral column 100 includes a lumbar region 102, a sacral region 104, and a coccygeal region 106. The vertebral column 100 also includes a cervical region 105 and a thoracic region 107 (shown in FIG. 1). The lumbar region 102 of the vertebral column 100 includes a first lumbar vertebra 108, a second lumbar vertebra 110, a third lumbar vertebra 112, a fourth lumbar vertebra 114, and a fifth lumbar vertebra 116. The sacral region 104 includes a sacrum 118. Further, the coccygeal region 106 includes a coccyx 120.

As shown in FIG. 2, a first intervertebral lumbar disc 122 is disposed between the first lumbar vertebra 108 and the second lumbar vertebra 110. A second intervertebral lumbar disc 124 is disposed between the second lumbar vertebra 110 and the third lumbar vertebra 112. A third intervertebral lumbar disc 126 is disposed between the third lumbar vertebra 112 and the fourth lumbar vertebra 114. A fourth intervertebral lumbar disc 128 is disposed between the fourth lumbar vertebra 114 and the fifth lumbar vertebra 116. A fifth intervertebral lumbar disc 130 is disposed between the fifth lumbar vertebra 116 and the sacrum 118. Zygapophysial joints 125, also known as facet joints or z-joints, are located on the posterior of the vertebral column 100 on each side where two adjacent vertebrae (108, 110, 112, 114, 116) meet.

If one of the intervertebral lumbar discs (i.e., 122, 124, 126, 128, 130) is diseased, degenerated, or damaged or if one of the zygapophysial joints 125 is diseased, degenerated, or damaged, that disc or joint can be at least partially treated using an implanted device that provides rigid fixation, dynamic fixation, or adjustable fixation, including noninvasively adjustable fixation. For example, a disc replacement device can be inserted into one of the intervertebral lumbar disc (e.g., 122, 124, 126, 128, 130) or one or more of the zygapophysial joints (e.g., 125).

In humans who are standing in a neutral position, a normal lumbar spine may be described as having a lumbar lordosis angle (LLA) 127 in the sagittal plane (i.e., the anatomical plane which divides the body into right and left halves) between about 20° and 40°. An LLA less than 20° is frequently considered lumbar hypolordosis and an LLA greater than 40° is frequently considered lumbar hyperlordosis. Similarly, the normal thoracic spine may be described as having a thoracic kyphosis of between about 20° and 50°, or between about 20° and 45°, or between about 25° and 45°. The lumbar region 102 is one of the key support elements for the upper portion of the body, weight (W) of which may, in many persons, constitute 50% or more of the persons' total body weight. The lordosis of the lumbar spine critically contributes to the lumbar region's 102 ability to support large amounts of weight. It is also important (along with the thoracic kyphosis) to a person's balance. When describing a patient's full or complete body herein (or simply "patient's body"), the term should be inclusive of all parts of the body, including the head and feet. Other modifiers may be used to denote specific portions of the patient's body (e.g., "upper body portion").

Attempts may be made to position the body during prone lumbar spine surgery (such as illustrated in FIG. 1) in such a way to mimic normal lumbar lordosis. However, simply matching the patient's normal lumbar lordosis angle (LLAn) or a desired lumbar lordosis angle (LLAd) frequently does not create an anatomically or physiologically accurate condition. This is because many of the parameters of a normal standing, walking, sitting, running, or even reclining person are not recreated. First, the upper body portion weight W is not being applied to the lumbar region 102 during a prone lumbar spine surgery. Nor is a moment M, related to the upper body portion weight W (shown in FIG. 2), experienced by the lumbar region 102. Furthermore, the body muscles 132, which can generate forces to help support the lumbar region 102, are not in the same condition (e.g., flexed, toned, or contracted). Body muscles 132 may include, but are not limited to, leg muscles 134 (e.g., quadriceps, hamstring), gluteal muscles 136 (e.g., gluteus maximus, gluteus minimus), abdominal muscles 138, and other muscles and/or muscle groups. In addition, the body comprises a large percentage of water (one might call it a pressure vessel). Some types of anesthesia may significantly change vascular tone, for example, blood vessel dilation or construction. Such changes in vascular tone may alter the surrounding forces on the lumbar region 102 and the vascularization and mechanical condition of the lumbar region 102. Intraabdominal pressure in an upright person is at least partially dependent on the hydrostatic pressure of water in the body. Therefore, in a prone (or otherwise horizontally-oriented) patient, the abdominal pressure is likely changed, thus further changing the condition on the lumbar region 102. Moreover, during surgery body temperature commonly drops as much as one degree Celsius, or more, which may further affect any of the conditions mentioned.

Numerous types of surgery are performed with a primary purpose of improving the patient's mobility by changing the shape or condition of a portion of the patient's skeletal system. These surgeries may also reduce pain that the patient feels when in certain positions or when performing certain movements. Many of the higher stress positions or movements (and therefore, the positions and movements commonly responsible for increased pain) occur when a patient is in an erect (e.g., standing, walking, running) or a sitting position. In both erect and sitting positions, the lumbar region 102 of the vertebral column 100 fully or partially supports the upper body portion weight W. Oftentimes, the effect of a surgical procedure on the lumbar region 102 is not fully known until a patient has recovered, at least partially and sometimes fully, from surgery, and is able to engage in common movements and/or positions (e.g., run, walk, stand, sit), and thereby judge whether balance has improved, pain has diminished, stiffness has decreased, mobility has increased, or other factors have improved (e.g., in a noticeable fashion). Because the mechanical/physical conditions experienced by patients during surgery are so unlike the key high-stress positions and/or actions the patient typically experiences, the surgical technique tends to be based on a certain amount of conjecture or guesswork.

Examples of surgeries in the lumbar region 102 area include, but are not limited to: Anterior Lumbar Interbody Fusion (commonly known as "ALIF"), Foraminotomy, Forminectomy, Kyphoplasty, Laminectomy, Laminoplasty, Laminotomy, Posterior Lumbar Interbody Fusion (commonly known as "PLIF"), Scoliosis correction, including modifying a coronal plane deformity, Spinal Decompression, Spinal Fusion, Spinal Osteotomy, and Transforaminal Lumbar Interbody Fusion (commonly known as "TLIF"). Along with these procedures, a discectomy or microdiscectomy may be performed. Lasers may be used in such surgical procedures. The procedures may be performed with normal incisions, or with smaller incisions (e.g., minimally invasive surgery). Some procedures may be performed endoscopically. Thoracoscopic surgery may include, for example, thoracoscopic release. In a large number of procedures, spinal instrumentation may be implanted to fixate or "instrument" a portion of the spine. This may include holding one or more vertebrae static with respect to one or more other vertebrae, for example, to aid fusion. Spinal instrumentation may include metal rods, screws, hooks, wires, and/or other materials, including polymers like PEEK.

Certain types of spinal instrumentation allow a finite, controlled amount of movement between bones (e.g., vertebrae); these types of spinal instrumentation are often called dynamic stabilization instrumentation. Other types of spinal instrumentation include adjustable spinal instrumentation. These include instrumentation that may be adjusted (e.g., lengthened or distracted) via a minimally invasive puncture or small incision. For example, through such a minimally invasive puncture or incision, a screw may be loosened, then a spinal rod may be lengthened, and then the screw may be retightened to again hold the spinal rod. Some such instrumentation has been named "growing rods." One such implant is the VEPTR® or VEPTR II™ (Vertical Expandable Prosthetic Titanium Rib), manufactured by DePuySynthes, West Chester, PA, USA. Recently, non-invasively adjustable spinal instrumentation has been developed which allows non-invasive post-surgical adjustment (e.g., lengthening, shortening). That is, no additional incision is required. For example, the MAGEC® system, manufactured by Ellipse Technologies, Inc., Irvine, CA, USA, is a magnetically adjustable implant that may be lengthened or shortened after implantation by the use of an externally applied magnetic field (e.g., a rotating magnetic field).

In addition to the changes in normal anatomy and physiology described above, a prone surgical position may place blood vessels in vulnerable positions, including, but not limited to, the vena cava, the aorta, the carotid artery, and/or the saphenous vein. The prone position may also make the patient's body susceptible to hyperextension of joints, and may increase the chance of damage to nerves including, but not limited to, the radial, brachia I, median, and/or ulnar nerves. The prone position may additionally place undesirable stress(es) on the lungs and/or other portions of the respiratory system.

Figure 3:
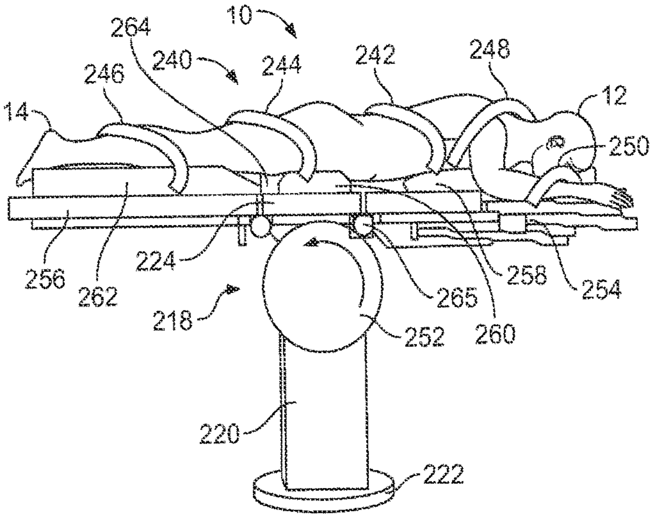
FIG. 3. A perspective view of an embodiment of a vertical surgical table in a first position.
Figure 4:
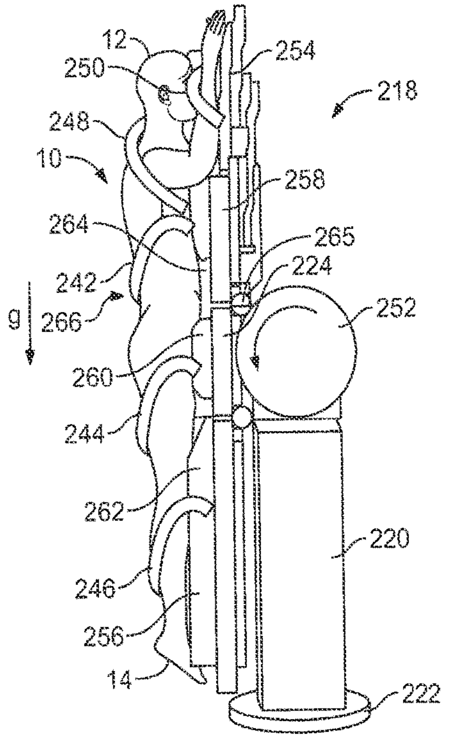
FIG. 4. A perspective view of the vertical surgical table of FIG. 3 in a second position.

FIGS. 3 and 4 illustrate a surgical table 218 configured to hold a patient 10. Though the word "table" is used, it should not be defined as a strictly horizontal structure. In fact, a feature of the surgical table 218 is that it includes a platform 224 that is configured to extend in either a generally horizontal direction (such as is shown in FIG. 3) or a generally vertical direction between its first end 254 and its second end 256 (such as is shown in FIG. 4). The platform 224 is shown in FIG. 3 coupled to a base 220 having an interface 222 (e.g., a floor interface). In FIGS. 3 and 4, the interface 222 is shown coupled to, and supported by, a floor, but it may alternatively be coupled, and secured, to a wall, a ceiling, or another solid structure/surface. In some embodiments, the platform 224 may be permanently attached to a wall, ceiling, floor, or other structure, in a vertical position (similar to that shown in FIG. 4) either via the base 220 or without the base 220 (i.e., directly attached). The base 220 may be configured to rest on the floor, and the base 220 may be configured to balance on the floor. The embodiment illustrated in FIGS. 3 and 4, however, shows the platform 224 adjustably coupled to the base 220 by a pivotable joint 252. The platform 224 may be rotationally adjusted between the horizontal position of FIG. 3 and the vertical position of FIG. 4, or any position in between. The rotating (manually or motorized) may be used to reversibly change the patient 10 position from approximately horizontal (prone, supine, lateral decubitus) to an approximately vertical (upright, equivalent to standing) during a surgical procedure, thereby creating access for a surgeon to initially place implants while the patient 10 is in prone position, then make final surgical adjustments with the patient 10 in vertical position. A motor (not shown) may be carried on the surgical table 218, and a control 265 may be used to adjust the platform 224 (e.g., rotate the platform 224 about the pivotable joint 252). FIG. 3 shows the patient in a prone, set-up position. That is to say that, the patient may be prepared (e.g., anesthetized, draped, swabbed, cleaned, etc.) in a prone position, prior to rotating the platform 224 to another desired position. The vertical position of the patient in FIG. 4 may be useful when performing vertical surgery, which can include any type of surgery that is benefitted by the patient's vertical orientation in relation to the earth's gravitational field. Such types of surgery may include the lumbar spine surgeries already mentioned, among several other surgeries that may benefit from the significantly different loads and conditions on the patient's body or portions of the patient's body. The manipulation of the sagittal plane may greatly benefit such surgeries. Examples of possibly advantageous manipulation include increasing or decreasing kyphosis, and/or increasing or decreasing lordosis. Examples include, but are not limited to, thoracic or thoracolumbar scoliosis surgery, limb lengthening (femur, tibia, fibula), trauma surgery (femur, tibia, fibula), ankle surgery, hip surgery, knee surgery, and surgery to correct rotational or angular defects of a bone.

In order to maintain the patient in a stable, substantially static condition during vertical surgery, one or more patient supports 240 may be coupled to the platform 224, and may include straps 242, 244, 246, 248, 250, and/or bolsters 258, 260, 262. In some embodiments, the straps 242, 244, 246, 248, 250 may include one or more of a hole, a pocket, a hook and loop fastener feature, a tie-off, an adhesive feature, a clamp, and a groove. In some embodiments, the bolsters 258, 260, 262 may include one or more of a pillow, a rod, a tube, a mound, a bag, a pad, an inflated structure, a filled structure, and a buttress. The bolsters 258, 260, 262 may be configured to at least partially support at least one of a head, a neck, a shoulder, an arm, and elbow, a hand, a chest, a waist, a hip portion, a leg, a knee, an ankle, a foot, or any combination thereof. The patient 10 may be secured to the platform 224 using the patient supports 240 such that the patient's weight is well supported (e.g., evenly, securely, firmly, immovably) in the vertical position of FIG. 4. In some embodiments, the patient supports may secure the patient 10 to the platform 224 without good distribution of the patient's weight. In an embodiment, the patient supports 240 are configured to support the patient in a zero-gravity environment, such as in space and underwater. The patient supports 240 may be configured to transfer much of the counterforce to the body weight to frictional forces against the platform 224 (which may include one or more pads 264) and the bolsters 258, 260, 262. Counterforce to the body weight may even be transferred by frictional forces against the straps 242, 244, 246, 248, 250. The orientation of the straps 242, 244, 246, 248, 250 may be configured to prevent over compression of one or more points on the patient's body (e.g., key point, pressure points, key nerves). Strap 242 may be used for securing the patient 10 at one or more locations at or on the waist. Strap 244 may be used for securing the patient 10 at one or more locations at or on the upper leg or thigh. Strap 246 may be used for securing the patient 10 at one or more locations at or on the lower leg or knee, or calf. Strap 248 may be used for securing the patient 10 at one or more locations at or on the shoulder or axilla (underarm). Strap 250 may be used for securing the patient 10 at one or more locations at or on the arm. Each of the straps 242, 244, 246, 248, 250 and bolsters 258, 260, 262 may be singular, or paired (e.g., one on each side), or multiple.

The platform 224, in its entirety or a portion thereof, may be adjustable in relation to the base 220. The first end 254 or the second end 256 may be adjustable, such as angularly, rotationally, linearly, or in multiple axis, in relation to the base 220. The platform 224 may be locked in relation to the base 220.

The orientation of each of the patient supports 240 is such that an open, accessible area 266 in the skin may be left available for surgical preparation. Depending on the configuration of the patient supports 240 chosen, that area 266 may be at least 60 $cm^2$, at least 120 $cm^2$, or at least 200 $cm^2$. The area 266 may be rectangular, square, circular, or any other shape that facilitates a surgical procedure, regardless of invasiveness (e.g., whether the surgery is minimally invasive or maximally invasive). In some embodiments, the vertical orientation of the patient may be adjusted to be partially vertical (i.e., from 90° to 60° from the direction of gravity), mostly vertical (i.e., from 20° to 60° from the direction of gravity), or substantially vertical (i.e., 0° to 20° from the direction of gravity). In some embodiments, the vertical orientation may be changed by around 180 degrees (e.g., from about positive vertical (i.e., feet down/head up) to about negative vertical (i.e., feet up/head down)). Adjustment away from vertical may be used to change (e.g., slightly change) the effective body weight of the patient, or the effective upper body portion weight W, which exerts force in the direction of gravity.

Figure 5:
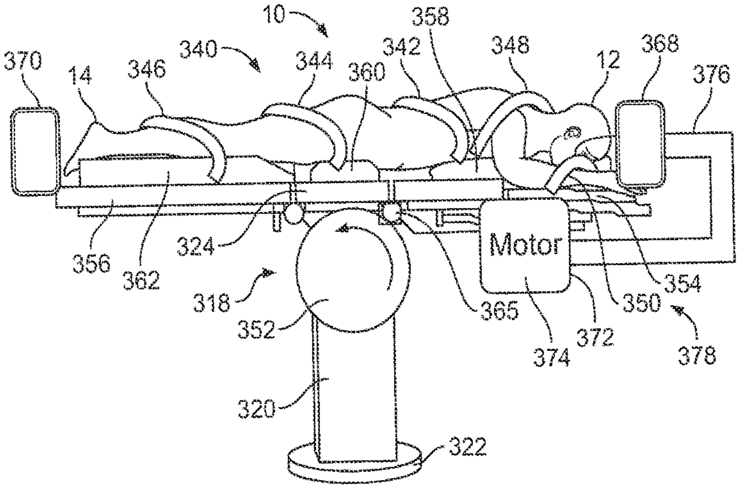
FIG. 5. A perspective view of another embodiment of a vertical surgical table in a first position.
Figure 6:
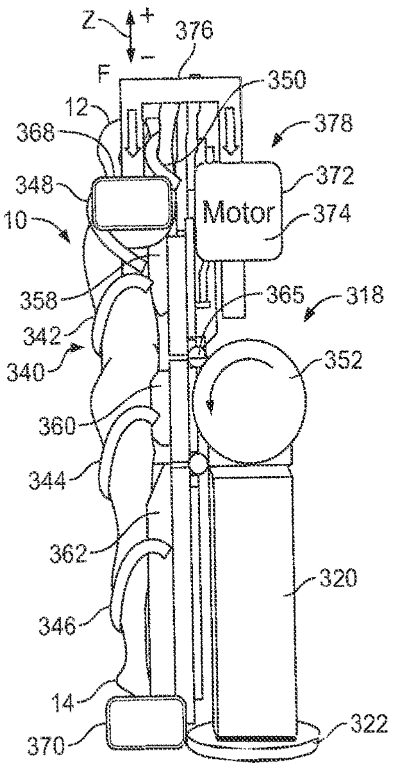
FIG. 6. A perspective view of the vertical surgical table of FIG. 5 in a second position.

FIGS. 5 and 6 illustrate a patient 10 on a surgical table 318 having an adjustable platform 324 and a base 320. The platform 324 has a first end 354 and a second end 356, and is adjustable in relation to a pivotable joint 352, by use of a control 365 and a motor 372. The base 320 may include an interface 322. Patient supports 340 may include one or more pads 360, straps 342, 344, 346, 348, 350 and bolsters 358, 360, 362, similar to those described above (i.e., pad 260, straps 242, 244, 246, 248, 250, and bolsters 258, 260, 262 of FIGS. 3 and 4). FIG. 6 illustrates a vertical surgical position of the patient 10.

The surgical table 318 includes a load adjustment module 378. The load adjustment module 378 may be disposed at the first end 354 such that it is positioned proximate to the patient's upper body portion, such as the patient's shoulders or heads, when the patient 10 is positioned on table 318. First stop 368 and second stop 370, each of which are coupled to the platform 324, are adjustable to apply a linear compressive force on the patient 10. In other embodiments, each of the stops 368, 370 or both of the stops 368, 370 may be adjustable in relation to the platform 324. However, in FIGS. 5 and 6, second stop 370 is shown to be fixably coupled to the platform 324, while first stop 368 is adjustably coupled to the platform 324 along an axis, which may be defined as the direction of the sagittal plane. A motor 372, adjustable via a control unit 374, is configured to adjust first stop 368 along axis Z, for example, by moving an arm 376 in a positive or negative direction along axis Z. When the first stop 368 is moved in the negative direction, the first stop 368 and the second stop 370 place/generate a longitudinally applied compressive force on the patient 10. In embodiments having an adjustably coupled second stop 370, when the second stop 370 is moved in the positive direction, the first stop 368 and the second stop 370 place/generate a longitudinally applied compressive force on the patient 10. The first stop 368 may have a fixed position.

FIG. 6 shows the stop 368 engaging one or more shoulder, and stop 370 engaging one or more foot and applying (or increasing) the compressive force. The stop 368 may be configured to engage the shoulder as a pair of first stops 368, each pair of stops 368 configured to apply force to each shoulder. Alternatively, a single stop 368 may only apply force to one shoulder or both shoulders. The stops 368, 370 may be configured to engage other parts of the patient's body, including, but not limited to the knee, buttock, head and neck. In some embodiments, the stops 368, 370 may be replaced by harnesses or hooks, and be configured to apply traction, instead of compression. The harnesses or hooks may be configured to engage other body portions, including, but not limited to the axilla, upper foot, knee, hip, thigh, groin, and even head or neck. In other embodiments, a pair of combination stop/harness fixtures may allow for both adjustable traction and adjustable compression. The patient's body parts may be engaged either in an uncovered or unclothed state, or in a covered or clothed state. By allowing adjustment of the forces on the patient, a desired surgical condition may be controllably applied/created. For example, in certain surgeries, it may be desired to control the compression or traction force, but limit or negate the effect of gravity—in such cases, the surgery may be performed on a patient in the horizontal position of FIG. 5 (thereby effectively eliminating standard upright gravity) while using the load adjustment module 378 to generate/simulate compression or traction forces.

Figure 7:
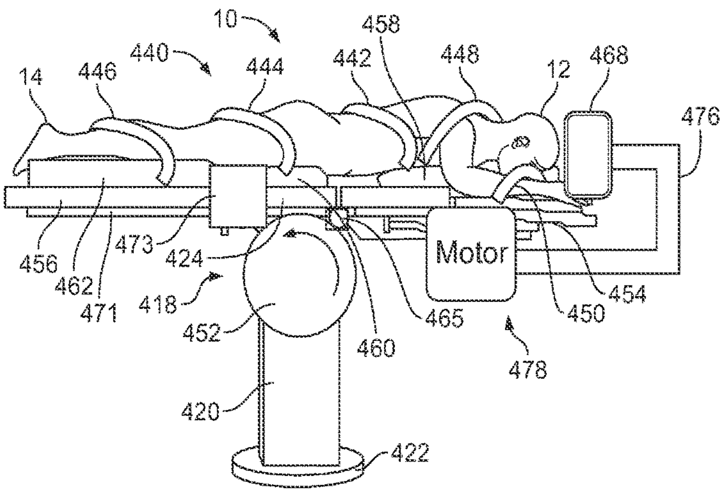
FIG. 7. A perspective view of a further embodiment of a vertical surgical table in a first position.
Figure 8:
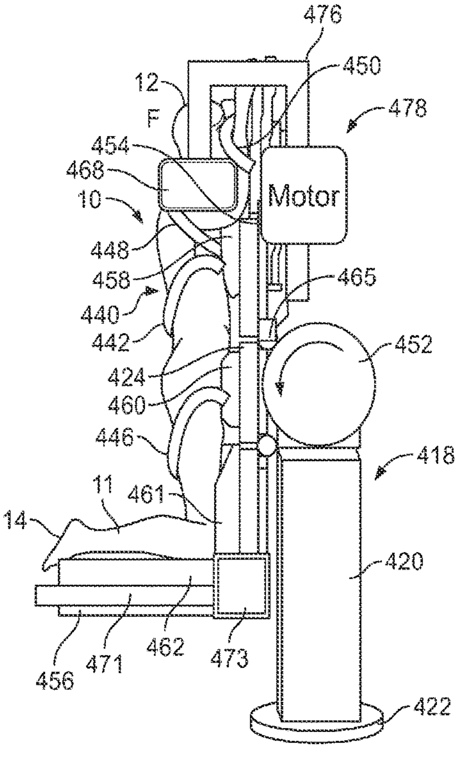
FIG. 8. A perspective view of the vertical surgical table of FIG. 7 in a second position.

FIGS. 7 and 8 illustrate a patient 10 on a surgical table 418 having an adjustable platform 424 and a base 420. The platform 424 has a first end 454 and a second end 456, and is adjustable in relation to a pivotable joint 452, by use of a control 465 and a motor (not shown). The base 420 may include an interface 422. The surgical table 418 has patient supports 440 that may include one or more pads 460, straps 442, 444, 446, 448, 450 and bolsters 458, 460, 462, similar to those described above (i.e., pad 260, straps 242, 244, 246, 248, 250 and bolsters 258, 260, 262 of FIGS. 3 and 4). FIG. 8 illustrates the vertical surgical position of a knee-to-shoulder portion of the patient 10. The first platform portion 471 may be adjusted (FIG. 8) so that the lower leg 11 of the patient 10 bends (e.g., extends in a substantially horizontal direction), while the knee-to-shoulder portion of the patient 10 extends in a substantially vertical direction. The table 418 includes a load adjustment module 478. The table 418 includes a first stop 468 adjustably coupled to the load adjustment module 478 via arm 476, and first platform portion 471 is pivotably coupled to the platform 324 via a pivot joint 473. The first stop 468 is adjustable relative to the first platform portion 471 to apply a linear compressive force F on the patient, for example, between the knees and the shoulder. Again, the first stop 468 and the first platform portion 471 may be used to engage other portions of the body and to apply forces between them. The first platform 471 may serve as a platform for feet or knees, and the first stop 468 may function as a bumper for the shoulders, such that a fraction (0-100%) of body weight can be applied through the skeleton. The table 418 may hold the patient 10 in a kneeling position while maintaining standing upright position of the torso.

As described in relation to the embodiment of FIGS. 5 and 6, harnesses or hooks (or the like) may be used to apply traction instead of compression.

Figure 9:
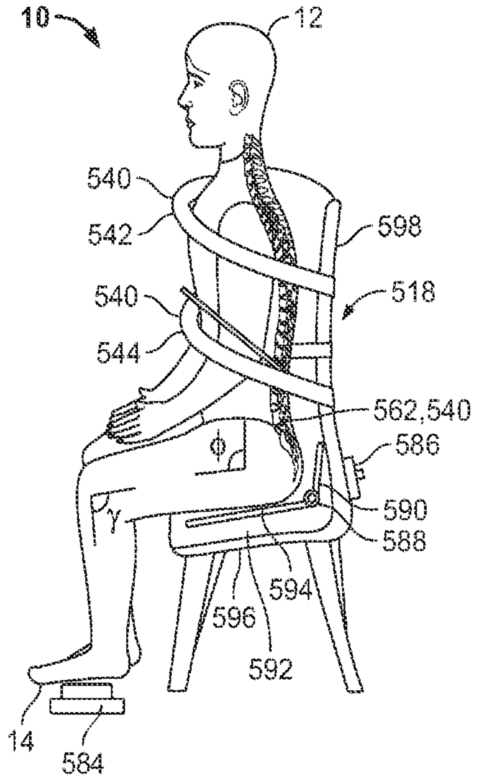
FIG. 9. A perspective view of an embodiment of a chair-based surgical table.
Figure 10:
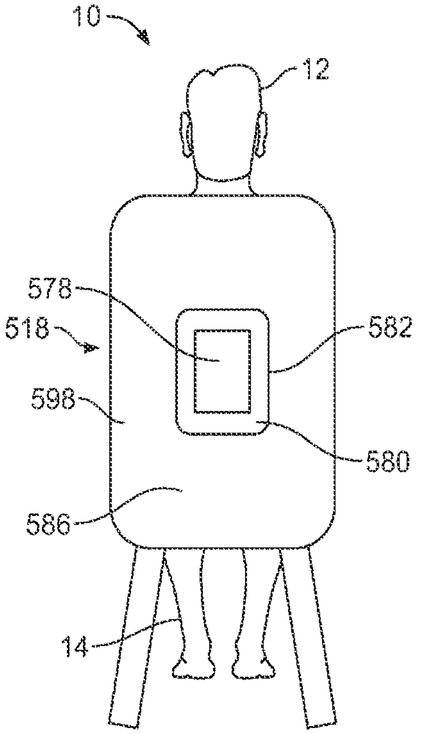
FIG. 10. A rear elevation view of the chair-based surgical table of FIG. 9.

FIGS. 9 and 10 illustrate a chair-based or seat-based surgical table 518. The surgical table 518 includes a backrest portion 598 and a seat portion 596. The backrest portion 598 and the seat portion 596 may each be contoured to best fit a patient's body. The seat portion 596 may be angularly adjustable in relation to the backrest portion 598 (e.g., angularly and/or linearly). In some embodiments, an internal plate 594 within a seat pad 592 is angularly adjustable with respect to a frame 590 attached to the backrest portion 598 about a pivot joint 588. The adjustment may be controlled by a control 586 which may operate a manual adjustment mechanism or a motorized adjustment mechanism. One or more patient supports 540 may include straps 542, 544 and bolsters 562. The straps 542, 544 and bolsters 562 may maintain spinal curvature in an anesthetized patient in a sitting position or a standing position, such that the patient's spinal curvature and sagittal balance are equivalent to the standing or sitting neutral position of the patient before surgery. One or more adjustable height footrests 584 may be used (with or without the internal plate 594 adjustment) to control femur-to-hip angle φ and/or femur-to-tibia angle y. An open window 582 through the backrest portion 598 may allow for surgical access to the patient. The open window 582 may be positioned and expose access to the lumbar region 102, the sacral region 104, the coccygeal region 106, the cervical region 105, and the thoracic region 107, or combinations thereof (shown in FIG. 2). The window 582 may enable surgical, percutaneous, or transcutaneous manipulation of spinal anatomy of the supine patient 10. Load adjustment modules, similar to the load adjustment modules 378, 478 of the embodiments of FIGS. 5-6 and FIGS. 7-8, may also be incorporated into the chair-based surgical table 518 of FIGS. 9 and 10. One or more portions of the chair-based surgical table 518 may comprise materials that are partially or completely radiolucent to enable intra-operative radiographic imaging.

Advantageously, the support structure(s) described herein is capable of replicating anatomical and physiological conditions that the patient experiences during the patient's normal activities, such as sleeping, standing, and sitting. In this way, the presently disclosed support structure(s) allow a surgeon to operate on a patient with the benefit of observing, during the operating procedure, the effects of the surgical technique target as well as enabling the surgeon to select surgical technique based on the anatomical and physiological conditions that the patient normally experiences. It is believed that this benefit of the present support structure(s) and methods of use will result in improved surgical outcomes for patients.

In relation to any of the embodiments disclosed herein, all of the patient's weight may be borne by the patient (e.g., the patient's feet). Alternatively, in relation to any of the embodiments disclosed herein, a portion may be borne by the patient (e.g., the patient's feet) while a portion is borne by a support structure (e.g., stop 368, 370, 468 or first platform portion 471). The embodiments described herein may be used in surgical procedures which use general anesthesia, conscious sedation, local anesthesia, or other varieties of anesthesia. One or more drugs may be given to modify muscle tone of the patient 10. Stimulation, for example electrical stimulation, may be used to modify muscle tone. Stimulation may be done percutaneously, transcutaneously, or via an open or minimally invasive incision. A sterile field may be maintained during open surgery in an upright patient, such as with tented sterile drapes may be used in any of the embodiments to prevent drifting or falling particulate from entering surgical wound. Filtered air handling equipment may be used to move clean air over patient and prevent particulate from entering surgical wound.

In an embodiment, a method of placing and manipulating a musculoskeletal implant in a patient is provided. The method includes positioning the patient such that the bones of the head, spine, pelvis, and lower extremity are oriented in an upright standing position. The method may include performing a surgical intervention, either through an open skin incision or with minimally invasive percutaneous methods. The surgical intervention may be performed with the use of a robotic or robot-assisted surgical system. The surgical intervention may be performed with the use of an image-guided navigation system. The surgical intervention is performed with the use of minimally invasive access cannulas, retractors, and surgical instruments. The surgical intervention may be performed with the use of a fiber optic visualization system. The surgical intervention may include non-invasively adjusting the implant with a transcutaneous device that activates the implant to manipulate internal anatomy. The surgical intervention may be performed to implant a device on or near the cervical spine, thoracic spine, lumbar spine, pelvis, one or more hip or knee joints, or any combination thereof. The implant may be: a lumbar pedicle fixation device that can modify sagittal spine curvature, a lumbar pedicle fixation device that can modify coronal spine curvature. The device may be adjusted to modify varus or valgus alignment of bones connected by a joint, and the device can be adjusted to address flexion-extension misalignment of bones connected by a joint.

In another embodiment, a method for performing a surgical procedure is provided. The method includes placing a patient in a patient support platform having a first end and a second end and configured for secure placement with respect to at least one surface of a building structure, wherein the patient support platform is configured to interface with a patient such that at least the torso of the patient extends in a generally vertical direction between the first end and the second end of the patient support platform, the patient support platform including one or more patient supports coupled thereto and configured to maintain the position of the patient with respect to the patient support platform, such that the at least the torso of the patient remains in a substantially static condition, and such that a target portion of the patient is accessible. The method includes placing an external adjustment device in proximity to the target portion of the patient, and performing an adjustment procedure on the patient. The external adjustment device may be a magnetic device and configured to adjust a magnetic implant within the patient. The anatomy of the patient 10 may be manipulated by non-invasive external remote control of the magnetic implant.

In some embodiments, a method for performing surgery is provided. The method includes placing a surgical patient in a patient support platform having a first end and a second end and configured for secure placement with respect to at least one surface of a building structure, wherein the patient support platform is configured to interface with a patient such that at least the torso of the patient extends in a generally vertical direction between the first end and the second end of the patient support platform, the patient support platform including one or more patient supports coupled thereto and configured to secure the patient to the patient support platform, such that the at least the torso of the patient is held in a substantially static condition, and such that a target portion of the patient's skin is accessible for surgical puncture or incision. The method includes using one or more of the one or more patient supports to secure the surgical patient to the patient support platform, and performing surgery on the patient. The surgery may be performed through a window in the patient support platform.

In addition to performing surgery with a patient positioned using the various systems and methods disclosed herein, other procedures may be performed in a conscious (i.e., awake) and/or non-surgical patient. For example, patients who have been implanted with non-invasively adjustable spinal instrumentation, such as the MAGEC® system, may be placed in, on, adjacent, or against any of the embodiments described herein to have their non-invasive adjustment procedures performed. For example, a window in any embodiments disclosed herein, may be configured to allow the placement of an external adjustment device (e.g., magnetic external adjustment device) adjacent the skin of the patient to perform non-invasive adjustment (lengthening, shortening, etc.). Additionally, patients who have been implanted with implants which are adjustable via a minimally invasive procedure (e.g., growing rods, VEPTR®) may be placed in, on, adjacent, or against any of the embodiments described herein to have their minimally invasive adjustment procedures performed.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure is not to be interpreted as reflecting an intention that any claim requires more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A method for performing a surgical procedure, the method comprising:

positioning a patient in a surgical patient interface device, the surgical patient interface device comprising:

a base, a platform coupled to the base and including first and second ends, and a first abutment and a second abutment each coupled to the platform;

rotating the platform between a first position and a second position, wherein, in the first position, the platform extends between the first and second ends in a substantially horizontal direction relative to the base, and the first and second abutments are separated by a first distance along the substantially horizontal direction, and wherein, in the second position, the platform extends in a substantially vertical direction relative to the base such that a torso of the patient extends in the substantially vertical direction;

adjusting one or both of the first and second abutments relative to the platform so that, in the second position, the first and second abutments are separated by a second distance along the substantially vertical direction, the second distance being different from the first distance; and accessing a target portion of skin of the patient for the surgical procedure.

2. The method of claim 1, further comprising rotating the platform about a pivotable axis that is stationary relative to the base.

3. The method of claim 1, further comprising coupling the platform to a wall, a ceiling, or a floor.

4. The method of claim 1, further comprising positioning the patient with a head of the patient towards the first end, and a knee, buttock, or feet of the patient towards the second end.

5. The method of claim 1, further comprising positioning the patient in a prone position in the surgical patient interface device.

6. The method of claim 1, further comprising: fixably coupling one of the first and second abutments to the platform, and adjustably coupling the other one of the first and second abutments to the platform.

7. The method of claim 1, wherein one of the first and second abutments is configured to engage one or more of a head, neck, shoulder, axilla, foot, knee, or buttock of the patient.

8. The method of claim 1, wherein adjusting one or both of the first and second abutments includes moving one or more of the first and second abutments relative to the other along a sagittal plane of the patient and applying a traction force or a compression force on at least a portion of the patient.

9. The method of claim 8, further comprising applying the traction force or the compression force when the platform is in the second position and the torso of the patient extends in the substantially vertical direction.

10. The method of claim 1, further comprising coupling a load control module to the platform and adjustably coupling one of the first and second abutments to the load control module.

11. The method of claim 10, wherein the load control module comprises: a motor; and an arm coupled to the motor and to one of the first and second abutments.

12. The method of claim 11, wherein adjusting one or both of the first and second abutments includes moving the arm and adjusting a distance between the first and second abutments to be the second distance when the platform is in the second position.

13. The method of claim 1, further comprising coupling one or more patient supports to the platform and releasably securing the patient to the platform with the one or more patient supports, such that the torso of the patient is held in a substantially static condition.

14. The method of claim 1, further comprising accessing the target portion of the skin of the patient through a window in the platform for the surgical procedure.

15. The method of claim 14, wherein the target portion of the skin is disposed on the posterior of the patient adjacent a lumbar vertebra of the patient.

16. The method of claim 1, wherein the surgical procedure includes one or more of a lumbar spine surgery, a thoracic spine surgery, a sacral spine surgery, a thoracic or thoracolumbar scoliosis surgery, a limb lengthening, a trauma surgery on a femur, a tibia, or a fibula, an ankle surgery, a hip surgery, a knee surgery, or a surgery to correct a rotational or angular defect of a bone.

17. The method of claim 1, wherein the surgical procedure is an open invasive, minimally invasive, or noninvasive procedure.

18. A method for inserting and adjusting a spinal implant, the method comprising:

providing a surgical patient interface device comprising:
- a base,
- a platform coupled to the base and including first and second ends, and
- a first abutment and a second abutment each coupled to the platform;

positioning a patient in a first position of the platform in which the platform extends between the first and second ends in a substantially horizontal direction relative to the base;

inserting a spinal implant in the patient when the patient is positioned in the first position of the platform;

rotating the platform to a second position in which the platform extends in a substantially vertical direction relative to the base such that a torso of the patient extends in the substantially vertical direction;

changing a distance between the first and second abutments and applying a traction force or a compression force on at least a portion of the patient; and adjusting the spinal implant when the torso of the patient extends in the substantially vertical direction.

19. The method of claim 18, further comprising rotating the platform about a pivotable axis that is stationary relative to the base.

20. The method of claim 18, further comprising noninvasively adjusting the spinal implant using an external device.

* * * * *